(12) United States Patent
Cardoso et al.

(10) Patent No.: US 11,898,835 B2
(45) Date of Patent: Feb. 13, 2024

(54) CONFIGURATION OF A NON-DESTRUCTIVE TESTING DEVICE

(71) Applicant: COMMISSARIAT A L'ENERGIE ATOMIQUE ET AUX ENERGIES ALTERNATIVES, Paris (FR)

(72) Inventors: Michel Cardoso, Boulogne-Billancourt (FR); Thomas Desrez, Palaiseau (FR); Sebastien Bey, Bullion (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 481 days.

(21) Appl. No.: 17/285,292

(22) PCT Filed: Oct. 14, 2019

(86) PCT No.: PCT/FR2019/052429
§ 371 (c)(1),
(2) Date: Apr. 14, 2021

(87) PCT Pub. No.: WO2020/079355
PCT Pub. Date: Apr. 23, 2020

(65) Prior Publication Data
US 2021/0389119 A1 Dec. 16, 2021

(30) Foreign Application Priority Data
Oct. 16, 2018 (FR) ........................................ 1859569

(51) Int. Cl.
*G01B 11/02* (2006.01)
*G01B 11/00* (2006.01)
(Continued)

(52) U.S. Cl.
CPC ............ *G01B 11/002* (2013.01); *G01B 5/016* (2013.01); *G01B 11/007* (2013.01); *G06V 10/245* (2022.01); *G06V 20/52* (2022.01)

(58) Field of Classification Search
CPC .... G01B 5/016; G01B 11/002; G01B 11/005; G01B 11/007
(Continued)

(56) References Cited

U.S. PATENT DOCUMENTS 5,748,854 A 5/1998 Watanabe et al.
6,288,785 B1 9/2001 Frantz et al.
(Continued)

FOREIGN PATENT DOCUMENTS

EP 1 096 268 A2 5/2001

OTHER PUBLICATIONS

International Search Report dated Feb. 26, 2020 in PCT/FR2019/052429 filed Oct. 14, 2019, 2 pages.
(Continued)

*Primary Examiner* — George B Bennett
(74) *Attorney, Agent, or Firm* — Oblon, McClelland, Maier & Neustadt, L.L.P.

(57) ABSTRACT

A method for configuring a device for non-destructive testing of a mechanical part, the device including an optical motion-tracking system, a non-destructive testing probe fixedly linked to a first rigid body, and a pointing device, includes steps of: learning of an origin and of axes of an examination area of the surface of the mechanical part using the pointing device, in a coordinate system linked to the optical motion-tracking system, so as to define a coordinate system linked to the examination area, learning of an origin and of axes of an emitter and receiver surface, called active surface, of the probe using the pointing device, in a coordinate system linked to the first rigid body of the probe, and
(Continued)

determination of the position and of the orientation of the active surface of the probe, in the coordinate system linked to the examination area.

12 Claims, 3 Drawing Sheets

(51) Int. Cl.
    *G01B 5/016*     (2006.01)
    *G06V 10/24*     (2022.01)
    *G06V 20/52*     (2022.01)

(58) Field of Classification Search
    USPC .......................................................... 33/559
    See application file for complete search history.

(56) References Cited

U.S. PATENT DOCUMENTS

| | | | | |
|---|---|---|---|---|
| 9,041,914 | B2* | 5/2015 | Tohme | H04N 13/204 |
| | | | | 356/3.01 |
| 9,476,695 | B2* | 10/2016 | Becker | G01C 15/002 |
| 11,673,256 | B2* | 6/2023 | Angood | B25J 9/1623 |
| | | | | 33/503 |
| 11,768,067 | B2* | 9/2023 | Angood | B25J 18/002 |
| | | | | 33/503 |
| 2011/0119025 | A1 | 5/2011 | Fetter et al. | |
| 2014/0028805 | A1* | 1/2014 | Tohme | G01B 11/2518 |
| | | | | 348/47 |
| 2014/0268093 | A1* | 9/2014 | Tohme | G01S 17/48 |
| | | | | 356/3.08 |
| 2020/0376672 | A1* | 12/2020 | Wolf | G01B 11/24 |
| 2021/0372769 | A1* | 12/2021 | Eiles | G01B 11/24 |

OTHER PUBLICATIONS

Preliminary French Search Report dated Aug. 7, 2019 in French Patent Application No. 1859569 filed Oct. 16, 2018, 2 pages (with Translation of Category).

* cited by examiner

CONFIGURATION OF A NON-DESTRUCTIVE TESTING DEVICE

TECHNICAL FIELD

The present invention generally relates to non-destructive testing of mechanical parts. More particularly, it relates to the definition and configuration of a work scene in space for an operator carrying out a manual acquisition of measurements on a mechanical part to be tested.

State of the Art

In the context of a non-destructive testing, an operator may have to manually inspect a mechanical part or a portion thereof, using a probe and acquisition electronics.

The non-destructive testing of a mechanical part is used in particular to test welds.

The known techniques suppose a prior knowledge of the geometry of the part to be inspected. This is the case for example of the technique described in FR 97 15902 which further uses a mechanical carrier system, which introduces inaccuracies inherent to such a system. Thus, there is an accumulation of the geometrical inaccuracies of the carrier, of the gripping system of the probe and of fastening of the carrier on the part to be inspected.

In addition, the mechanical system results in poor maneuverability.

Finally, a model of the probe and of its gripping system shall be known in advance in order to be preloaded in a calculator.

EP 1096268 relates to a hybrid system for tracking an object in real-time within a specified volume. This system comprises an optical subsystem and a non-optical subsystem.

U.S. Pat. No. 5,748,854 relates to robot position learning. A position learning unit is used to teach a position to an industrial robot.

DISCLOSURE OF THE INVENTION

The invention aims at solving the problems of the prior art by providing a method for configuring a device for non-destructive testing of a mechanical part, the device including an optical motion-tracking system, a non-destructive testing probe fixedly linked to a first rigid body, and a pointing device including a point and fixedly linked to a second rigid body, characterized in that it includes steps of:

learning of an origin of an examination area of the surface of the mechanical part using the pointing device, in a coordinate system linked to the optical motion-tracking system, learning of axes of the examination area of the mechanical part using the pointing device, in the coordinate system linked to the optical motion-tracking system, so as to define a coordinate system linked to the examination area, learning of an origin and of axes of an active surface of the probe using the pointing device, in a coordinate system linked to the first rigid body of the probe, and determination of the position and of the orientation of the active surface of the probe, in the coordinate system linked to the examination area.

The present invention does not require any mechanical carrier system. On the contrary, it is particularly advantageous in the context of a testing performed manually by an operator. For example, this enables an operator to carry out an in situ testing of a mechanical part without any complex installation of a mechanical carrier system.

The present invention does not require any prior knowledge of the dimensions of the geometry of the part to be inspected.

Thanks to the invention, the accuracy on the position and orientation of the probe is only related to the optical motion-tracking system.

According to a preferred feature, the steps of learning the origin and the axes of the examination area includes the determination of a transformation matrix allowing switching from the coordinate system linked to the optical motion-tracking system into the coordinate system linked to the examination area.

According to a preferred feature, the step of learning the origin and the axes of the active surface of the probe includes the determination of a transformation matrix allowing switching from the coordinate system linked to the optical motion-tracking system into the coordinate system linked to the first rigid body and of a transformation matrix allowing switching from a coordinate system linked to the active surface of the probe into the coordinate system linked to the first rigid body.

According to a preferred feature, the step of determining the position and the orientation of the active surface of the probe, in the coordinate system linked to the examination area, includes a tracking of the motion of the first rigid body linked to the probe by the optical motion-tracking system, a determination of a dynamic matrix, which is the transformation matrix allowing switching from the coordinate system linked to the first rigid body into the coordinate system linked to the optical motion-tracking system, a determination of a transformation matrix allowing switching from the coordinate system linked to the active surface of the probe into the coordinate system linked to the examination area.

According to a preferred feature, the device further including a calculator, a memory and a control module for controlling a recording of the position of the point in memory, the method includes a memorization of the origin and of the axes of the examination area, and of the origin and of the axes of the active surface of the probe, in the coordinate system linked to the optical motion-tracking system.

According to a preferred feature, the method includes a memorization of the origin and of the orientation of the active surface of the probe, in a coordinate system linked to the examination area.

According to a preferred feature, the method also includes a step of determining the dimensions of the examination area.

The invention also relates to a method for non-destructive testing of a mechanical part, including the prior execution of the configuration method as previously disclosed characterized in that it includes at least one step amongst:

Determination of the speed of displacement of the active surface of the probe,

Checking of the orientation of the probe with respect to the coordinate system linked to the examination area, Checking of the completion of the coverage of the examination area, with regards to a predefined coverage, Checking of the coupling between the active surface of the probe and the examination area of the mechanical part.

The invention also relates to a device for non-destructive testing of a mechanical part, including an optical motion-tracking system, a non-destructive testing probe fixedly linked to a first rigid body, a pointing device including a tip and fixedly linked to a second rigid body, and a calculator, characterized in that the calculator is configured to:

learn an origin of an examination area of the surface of the mechanical part using the pointing device, in a coordinate system linked to the optical motion-tracking system, learn axes of the examination area of the mechanical part using the pointing device, in the coordinate system linked to the optical motion-tracking system, so as to define a coordinate system linked to the examination area, learn an origin and axes of an active surface of the probe using the pointing device, in a coordinate system linked to the first rigid body of the probe, and determine the origin and the orientation of the active surface of the probe, in a coordinate system linked to the examination area.

According to a preferred feature, the calculator is also configured to determine the dimensions of the examination area.

According to a preferred feature, the calculator is also configured to perform at least one operation amongst:

Determining the speed of displacement of the active surface of the probe,

Checking the orientation of the probe with respect to the axes of the examination area, Checking the completion of the coverage of the examination area, with regards to a predefined coverage, Checking the coupling between the active surface of the probe and the examination area of the mechanical part.

The non-destructive testing method and the device have advantages similar to those presented before.

In a particular embodiment, the steps of the method according to the invention are implemented by computer program instructions.

Consequently, the invention also relates to a computer program on an information medium, this program being capable to be implemented in a computer, this program including instructions adapted to the implementation of the steps of a method as described hereinabove.

This program may use any programming language, and be in the form of a source code, object code, or an intermediate code between a source code and an object code, such as in a partially compiled form, or in any other desirable form.

The invention also relates to a computer-readable information medium, and including computer program instructions adapted for the implementation of the steps of a method as described hereinabove.

The information medium may consist of any entity or device capable of storing the program. For example, the medium may include a storage means, such as a ROM, for example a CD ROM or a ROM of a microelectronic circuit, or else a magnetic recording means, for example a floppy disk or a hard disk.

Furthermore, the information medium may consist of a transmissible medium such as an electrical or optical signal, which may be conveyed via an electrical or optical cable, by radio or by other means. In particular, the program according to the invention may be downloaded on an Internet-type network.

Alternatively, the information medium may consist of an integrated circuit into which the program is embedded, the circuit being adapted to execute or to be used in the execution of the method according to the invention.

BRIEF DESCRIPTION OF THE DRAWINGS

Other features and advantages will appear on reading the following description of a preferred embodiment provided as a non-limiting example, described with reference to the figures in which:

FIGS. 1$a$ to 1$d$ represent a non-destructive testing device according to an embodiment of the invention.

DETAILED DISCLOSURE OF PARTICULAR EMBODIMENTS

According to a preferred embodiment represented in FIG. 1, a device for non-destructive testing of a mechanical part includes an optical motion-tracking system 1 which serves to track the motion of an object in space and more particularly the motion of rigid bodies as described later on.

The optical motion-tracking system 1 is associated to an orthonormal coordinate system $R_O=(O, \vec{u}_O, \vec{v}_O, \vec{n}_O)$ where O is the origin of the coordinate system and $\vec{u}_O, \vec{v}_O$ and $\vec{n}_O$ are normed vectors orthogonal to one another.

The optical motion-tracking system 1 determines the Cartesian coordinates and the orientation of a rigid body in the orthonormal coordinate system of the optical motion-tracking system 1.

The optical motion-tracking system 1 includes at least two cameras and one or several infrared emitter(s). Other types of optical systems can be used in the context of the invention, for example an optical system based on laser and/or with pastille-type non-volumetric markers.

The non-destructive testing device includes a first rigid body 2 linked to a probe 3. The first rigid body 2 and the probe 3 are fixedly linked and form an integral assembly. The first rigid body 2 includes at least three infrared-reflective spherical targets located at distinct positions. The first rigid body 2 is associated to an orthonormal coordinate system $R_C=(C, \vec{u}_C, \vec{v}_C, \vec{n}_C)$ where C is the origin of the coordinate system and $\vec{u}_C, \vec{v}_C$ and $\vec{n}_C$ are normed vectors orthogonal to one another.

The shape of the first rigid body 2, that is to say the exact positioning of the spheres relative to one another, is known in advance in the coordinate system $R_C$.

In a preferred embodiment, the first rigid body 2 includes six spherical targets.

For example, the probe 3 is a single-element ultrasonic probe. It includes an emitter and receiver surface, called active surface, 31. The active surface 31 is a rectangle with a planar surface. Alternatively, the probe 3 is of another type, for example an eddy current probe.

In general, an active surface is any surface emitting or receiving physical signals belonging to a non-destructive testing probe. For example, in the case of a single-element contact ultrasonic probe, this corresponds to the surface of the piezoelectric. In the case of a single-element ultrasonic probe with a shoe made of «Plexiglas», this corresponds to the surface of the shoe throughout which the ultrasonic signals are emitted.

The invention is described for tracking of one probe, but it also applies to tracking of several probes, simultaneously and independently.

The non-destructive testing device includes a pointing device 4 which, in turn, includes a second rigid body 41 and a precision tip 42. The second rigid body 41 includes at least three infrared-reflective spherical targets located at distinct positions. The shape of the second rigid body 41, that is to say the exact positioning of the spheres relative to one another, is known in advance. The second rigid body 41 and the precision tip 42 are fixedly linked and form an integral assembly. The origin of the second rigid body 41 has been configured beforehand to correspond to the tip 42. Thus, the origin of the second rigid body 41 that will be measured by the optical motion-tracking system 1 as disclosed later on corresponds exactly to the physical point pointed with the pointing device.

In a preferred embodiment, the second rigid body 41 includes seven spherical targets.

The non-destructive testing device includes a control module 5 provided with at least one actuation button 51. Preferably, the control module 5 is mounted on the pointing device 4 to facilitate the use thereof.

The non-destructive testing device includes a calculator 6 connected to the optical motion-tracking system 1 and to the control module 5.

For example, the calculator 6 is a computer or an electronic board. In particular, it includes a processor executing a computer program implementing the method that will be described and a memory to memorize the results thereof. It also includes input and output interfaces and may be associated to a visualization screen.

The link between the calculator 6 and the optical motion-tracking system 1 may be wired or wireless. Similarly, the link between the calculator 6 and the control module 5 may be wired or wireless.

Figure 1A:
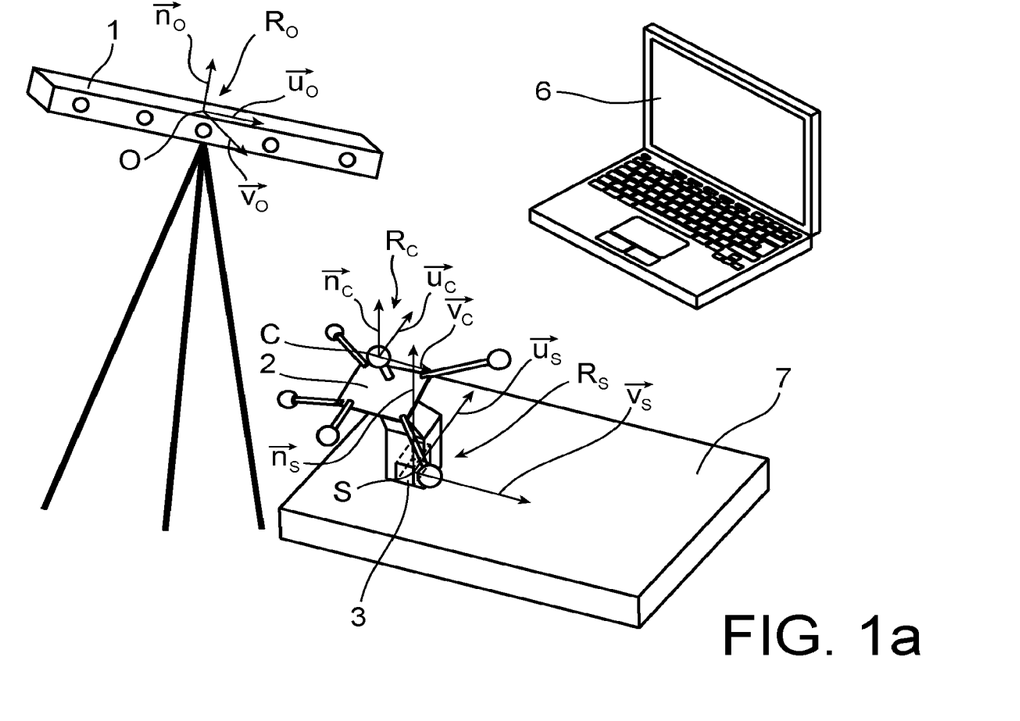
Figure 1B:
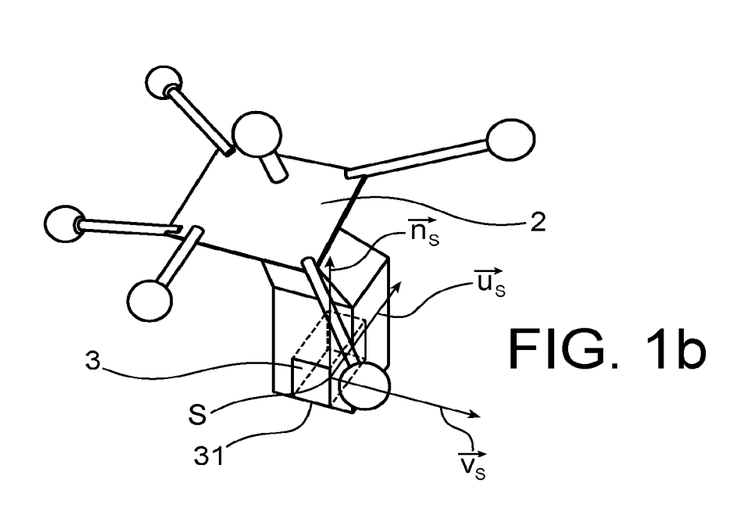
Figure 1C:
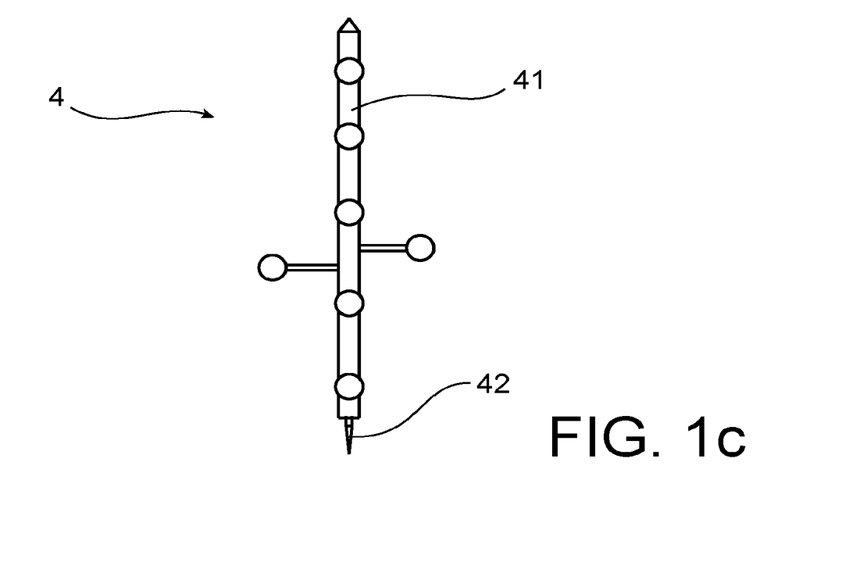
Figure 1D:
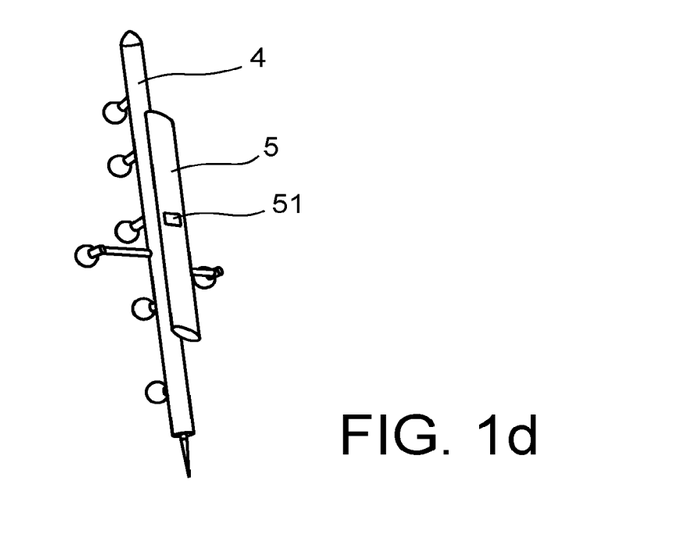
Figure 2:
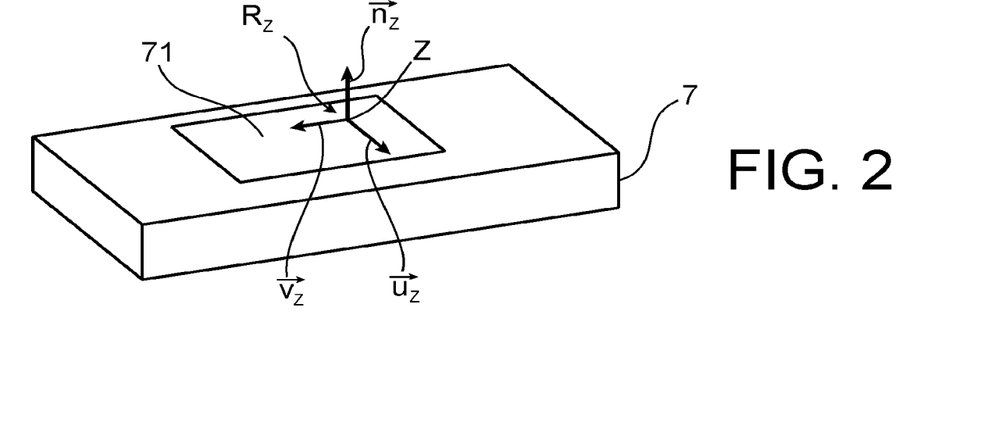
FIG. 2 represents a mechanical part to be tested by the non-destructive testing device of FIG. 1.

Referring to FIG. 2, a mechanical part to be tested 7 includes an area to be examined 71 defined over the surface of the mechanical part 7. The examination area 71 extends over all or part of the mechanical part. The examination area is on a portion of the mechanical part that has a surface with a known geometrical shape, such as for example a planar surface, a cylindrical surface or else a conical surface. In all cases, the geometrical shape of the examination area can be represented by an analytical function.

Figure 3:
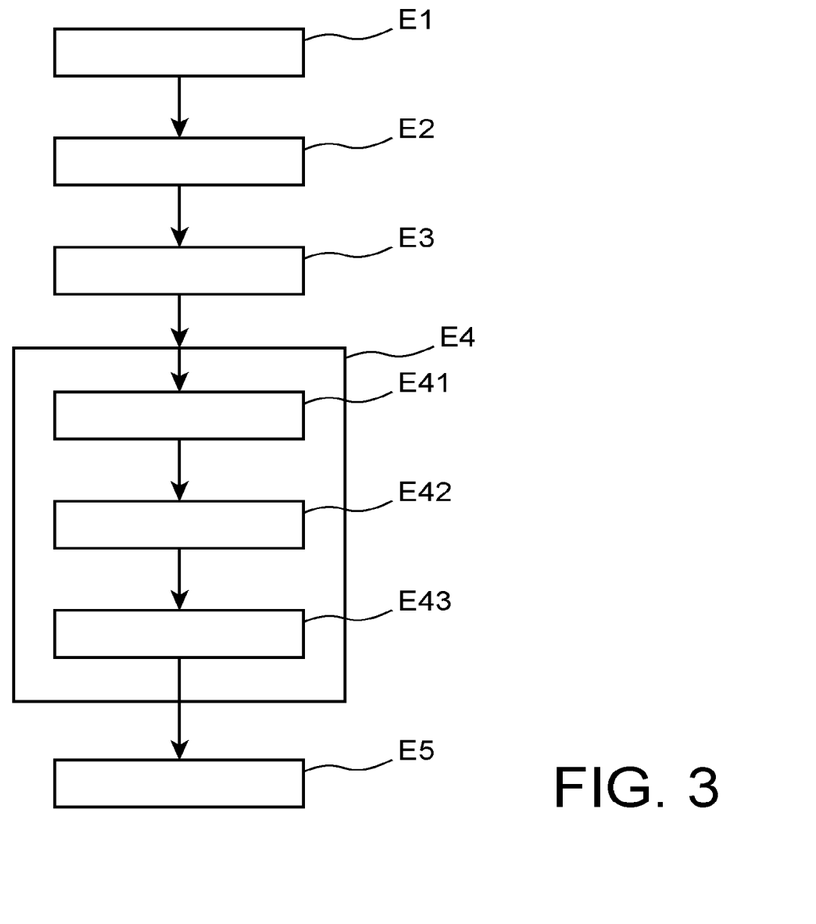
FIG. 3 represents a method for configuring the non-destructive testing device represented in FIG. 1, according to an embodiment of the invention.

FIG. 3 represents a method for configuring the non-destructive testing device represented in FIG. 1, in the form of a flowchart presenting steps E1 to E5.

We suppose that the described device has been disposed so as to be able to test the mechanical part 7. In particular, the examination area 71 is within the field of view of the cameras of the optical motion-tracking system 1.

Step E1 is the learning of a position of an origin Z of the examination area 71 in the coordinate system $R_O$ of the optical motion-tracking system 1.

The coordinate system $R_O$ is an orthonormal coordinate system in which the position and the orientation of the rigid bodies tracked by the optical motion-tracking system 1 are produced. We have $R_O=(O, \vec{u}_O, \vec{v}_O, \vec{n}_O)$, with O the origin of the coordinate system and $\vec{u}_O, \vec{v}_O, \vec{n}_O$ three normed and orthogonal vectors.

This operation determines the position in space that will serve as the origin throughout the testing of the examination area. The operator positions the tip of the pointing device 4 on a point of the surface of the examination area 71 that will serve as the origin to the testing. Starting from the image and from the field of view of each camera, each visible sphere of the second rigid body 41 has a position that is identified in the coordinates system of the optical motion-tracking system 1. The connection between the second rigid body 41 and the tip 42 being fixed, the position of the spheres determines the position of the tip, and therefore of the point of the surface of the examination area 71 on which it points, in the coordinates system of the optical motion-tracking system 1.

When the tip is positioned, the operator presses on the actuation button 51 of the control module 5, which controls recording by the calculator of the coordinates of the tip 42 of the pointing device 4 in the coordinate system $R_O$ of the optical motion-tracking system 1. The memorized position is the origin Z of the examination area 71.

Step E1 is followed by step E2 which is the learning of the dimensions and of the axes of the examination area 71 in the coordinate system $R_O$ of the optical motion-tracking system 1.

This operation determines the dimensions and axes of the examination area 71. The operator successively positions the tip 42 of the pointing device 4 on a plurality of points of the surface of the examination area 71. For each of these points, when the tip 42 is positioned, the operator presses on the actuation button 51 of the control module 5, which controls recording by the calculator of the coordinates of the tip 42 of the pointing device 4 in the coordinate system $R_O$ of the optical motion-tracking system 1.

The number M of points necessary and sufficient for determining the dimensions and the axes of the examination area 71 depends on the geometrical shape of the surface of the examination area 71.

For example, for an examination area with a planar surface and a rectangular shape, three points are necessary and sufficient to define the length and the width of the rectangle corresponding to the examination area. In the case of a cylindrical surface or of a conical surface, four points are required. In the case of a surface of an elliptical cylinder, six points are required. The determination of the dimensions of the examination area eliminates the need of an ad-hoc model of the mechanical part.

Once the M points of the examination area 71 have been determined and memorized, the calculator determines the dimensions of the examination area 71 and perpendicular axes constituting the axes of a coordinate system $R_Z=(Z, \vec{u}_Z, \vec{v}_Z, \vec{n}_Z)$, where Z is the point determined at the previous step, $\vec{n}_Z$ is a normed vector orthogonal to the surface of the examination area at the point Z, $\vec{u}_Z$ is a normed vector of an axis of the surface of the examination area and $\vec{v}_Z$ is a normed vector orthogonal to the previous two vectors.

A matrix $M_{Z,O}$ is the transformation matrix allowing switching from the coordinate system $R_O$ into the coordinate system $R_Z$. The matrix $M_{Z,O}$ is determined from the learning of the origin, of the axes and of the dimensions of the examination area 71 in the coordinate system $R_O$ of the optical motion-tracking system 1. The matrix $M_{Z,O}$ is determined by the expression of the vectors of the coordinate system $R_Z$ and the coordinates of the origin Z of the coordinate system $R_Z$ in the coordinate system $R_O$ and is then memorized in memory.

Step E2 is followed by step E3 which is the learning of the origin and of the axes of the active surface 31 of the probe 3, in the coordinate system $R_C$ of the first rigid body 2 associated to the probe 3.

This operation determines an origin S and axes of the active surface 31 of the probe 3 in the coordinate system $R_C$ of the first rigid body 2 associated to the probe 3.

For this purpose, the coordinates in the coordinate system $R_C$ of three remarkable points A, B, C forming a triangle, right-angled at A, and of the point S on the active surface 31 of the probe 3 shall be determined.

The operator positions the tip 42 of the pointing device 4 on four different points of the active surface 31 of the probe 3. At this step, the optical motion-tracking system 1 carries out tracking of the first and second rigid bodies. For each of the four points pointed by the tip of the pointing device, when the tip is positioned, the operator presses on the actuation button 51 of the control module 5, which controls recording by the calculator of the coordinates of the tip of the pointing device in the coordinate system $R_O$ of the optical motion-tracking system 1. Simultaneously, the coordinates and the orientation of the coordinate system $R_C$ of the first rigid body 2 associated to the probe 3 in the coordinate system $R_O$ are determined by the optical motion-tracking system 1 and are recorded. The coordinates and the orientation of the coordinate system $R_C$ of the first rigid body 2 depend on the position of the first rigid body 2 and therefore of the probe 3 relative to the coordinate system $R_O$. Hence, they shall be determined simultaneously with the determination of the three points A, B and C.

Then, the calculator determines perpendicular axes constituting the axes of a coordinate system $R_S$ of the active surface 31 of the probe 3, with $R_S=(S, \vec{u}_S, \vec{v}_S, \vec{n}_S)$, where S is the origin point, $\vec{n}_S$ is a normed vector orthogonal to the active surface at the point S, $\vec{u}_S$ is a normed vector of an axis of the active surface and $\vec{v}_S$ is a normed vector orthogonal to the previous two vectors. These vectors are formed from the points A, B and C.

Afterwards, the calculator performs the calculation of the position and of the orientation of the active surface 31 of the probe 3 in the coordinate system $R_C$ of the first rigid body 2 associated to the probe 3. For this purpose, the recorded positions of the points of the active surface 31 of the probe 3 are expressed in the coordinate system $R_C$ of the first rigid body 2 associated to the probe 3 via a coordinate system change between the coordinate system $R_O$ and the coordinate system $R_C$.

This coordinate system change uses a transformation matrix $M_{C,O}$ allowing switching from the coordinate system $R_O$ into the coordinate system $R_C$. The matrix $M_{C,O}$ is provided by the inversion of a matrix $M_{O,C}$. The matrix $M_{O,C}$ is determined from the information provided by the optical motion-tracking system 1 for the rigid body 2 linked to the probe 3. The matrix $M_{O,C}$ is determined according to the position and orientation of the coordinate system $R_C$ in the coordinate system $R_O$. The values of this matrix are dynamic since these are related to the first rigid body 2 linked to the probe 3 which is not static relative to the coordinate system $R_O$.

The matrix $M_{C,O}$ allows determining the coordinates in the coordinate system $R_C$ of the three remarkable points A, B, C forming a triangle, right-angled at A, and of the point S on the active surface 31 of the probe 3, from their coordinates in the coordinate system $R_O$ of the optical motion-tracking system 1.

The coordinates of these points in the coordinate system $R_C$ allow determining the position and the orientation of the coordinate system $R_S$ of the active surface 31 of the probe 3 in the coordinate system $R_C$, via a transformation matrix $M_{C,S}$ which allows switching from the coordinate system $R_S$ into the coordinate system $R_C$. The transformation matrix $M_{C,S}$ is memorized in memory.

It should be noted that a given set formed by a probe 3 and a first rigid body 2 whose connection is fixed, step E3 may be performed once and for all and its memorized results are used again each time the non-destructive testing device is implemented to test a mechanical part.

Step E3 shall be performed for each different set formed by a probe and a first rigid body that is used in the context of the invention.

Step E3 is followed by step E4 which is the determination of the origin and of the orientation of the active surface 31 of the probe, in the coordinate system $R_Z$ of the examination area 71. Step E4 includes substeps E41 to E43.

We will suppose that the operator displaces the probe 3 over the surface of the examination area 71.

Step E41 is a tracking of the motion of the first rigid body 2 linked to the probe 3 by the optical motion-tracking system 1.

The result is a set of positions and orientations of the first rigid body 2 linked to the probe 3, expressed in the coordinate system $R_O$ of the optical motion-tracking system 1.

The next step E42 is the determination of the dynamic matrix $M_{O,C}$, which is the transformation matrix allowing switching from the coordinate system $R_C$ into the coordinate system $R_O$.

As before, the values of this matrix are dynamic since they are related to the rigid body 2 linked to the probe 3 which is not static relative to the coordinate system $R_O$. Hence, the matrix $M_{O,C}$ depends on the motion of the rigid body 2.

The matric $M_{O,C}$ is provided by the result of step E41 of tracking the motion of the first rigid body 2 linked to the probe 3 by the optical motion-tracking system 1.

The next step E43 is the determination of the transformation matrix $M_{Z,S}$ allowing switching from the coordinate system $R_S$ into the coordinate system $R_Z$.

For any point P with the coordinates $X_S(P)$ in the coordinate system $R_S$, it is possible to write the following equation:

$$X_Z(P)=M_{Z,S} \cdot X_S(P)$$

Where $X_Z(P)$ represents the coordinates of the point P in the coordinate system $R_Z$ and $M_{Z,S}$ represents the transformation matrix allowing switching from the coordinate system $R_S$ into the coordinate system $R_Z$.

This equation is equivalent to:

$$X_Z(P)=M_{Z,O} \cdot M_{O,C} \cdot M_{C,S} \cdot X_S(P)$$

The matrix $M_{Z,O}$ is provided by the result of the learning steps E1 and E2.

The matrix $M_{C,S}$ is provided by the result of the learning step E3.

The matrix $M_{Z,S}$ allows to express the position and the orientation of the active surface 31 of the probe 3 in the coordinate system $R_Z$ of the examination area 71.

It should be noted that steps E1 to E4 are carried out without any prior knowledge of the geometry of the examination area or of that of the active surface.

Step E4 is followed by step E5 at which the position and the orientation of the active surface 31 of the probe 3 in the coordinate system $R_Z$ of the examination area 71 are displayed on a visualization screen.

The above-disclosed configuration of the device for non-destructive testing of a mechanical part allows guaranteeing the validity of a manual inspection of the mechanical part 7 performed by an operator using the device.

For this purpose, the configuration is performed at first. Thus, as the case may be, the operator performs, modifies or loads the configuration. Indeed, a given configuration can be used several times in the absence of modification of the different members that are used.

During the testing itself, the calculator then outputs the following information:

Position of the active surface 31 of the probe 3 relative to the coordinate system $R_Z$ of the examination area 71, Orientation of the active surface 31 of the probe 3 with respect to the coordinate system $R_Z$ of the examination area 71.

Starting from this information, the calculator is in particular capable of:

Determining the speed of displacement of the active surface 31 of the probe 3, Checking the compliance of the orientation of the probe 3 with respect to the axes of the examination area 71, Checking the completion of the coverage of the examination area 71, for example in terms of resolution, dimensions and geometry, with regards to a predefined coverage, by further using the information on the dimensions of the examination area, Checking the coupling (height and inclination) between the active surface 31 of the probe 3 and the examination area 71 of the mechanical part 7.

The invention claimed is:

1. A method for configuring a device for non-destructive testing of a mechanical part, the device including an optical motion-tracking system, a non-destructive testing probe fixedly linked to a first rigid body, and a pointing device including a tip and fixedly linked to a second rigid body, the method comprising:
   learning of an origin of an examination area of the surface of the mechanical part using the pointing device, in a coordinate system linked to the optical motion-tracking system,
   learning of axes of the examination area of the mechanical part using the pointing device, in the coordinate system linked to the optical motion-tracking system, so as to define a coordinate system linked to the examination area,
   learning of an origin and of axes of an emitter and receiver surface, called active surface, of the probe using the pointing device, in a coordinate system linked to the first rigid body of the probe, and
   determination of the position and of the orientation of the active surface of the probe, in the coordinate system linked to the examination area.

2. The method for configuring a device for non-destructive testing of a mechanical part according to claim 1, wherein the steps of learning the origin and the axes of the examination area includes the determination of a transformation matrix allowing switching from the coordinate system linked to the optical motion-tracking system into the coordinate system linked to the examination area.

3. The method for configuring a device for non-destructive testing of a mechanical part according to claim 1, wherein the step of learning the origin and the axes of the active surface of the probe includes the determination of a transformation matrix allowing switching from the coordinate system linked to the optical motion-tracking system into the coordinate system linked to the first rigid body and of a transformation matrix allowing switching from a coordinate system linked to the active surface of the probe into the coordinate system linked to the first rigid body.

4. The method for configuring a device for non-destructive testing of a mechanical part according to claim 1, wherein the step of determining the position and the orientation of the active surface of the probe, in the coordinate system linked to the examination area, includes
   a tracking of the motion of the first rigid body linked to the probe by the optical motion-tracking system,
   a determination of a dynamic matrix, which is the transformation matrix allowing switching from the coordinate system linked to the first rigid body into the coordinate system linked to the optical motion-tracking system,
   a determination of a transformation matrix allowing switching from the coordinate system linked to the active surface of the probe into the coordinate system linked to the examination area.

5. The method for configuring a device for non-destructive testing of a mechanical part according to claim 1, the device further including a calculator, a memory and a control module for controlling a recording of the position of the tip in memory, the method including a memorization of the origin and of the axes of the examination area, and of the origin and of the axes of the active surface of the probe, in the coordinate system linked to the optical motion-tracking system.

6. The method for configuring a device for non-destructive testing of a mechanical part according to claim 5, including a memorization of the origin and of the orientation of the active surface of the probe, in a coordinate system linked to the examination area.

7. The method for configuring a device for non-destructive testing of a mechanical part according to claim 1, wherein it also includes a step of determining the dimensions of the examination area.

8. A method for non-destructive testing of a mechanical part, including the prior execution of the configuration method according to claim 1,
   the method comprising at least one of:
   determination of the speed of displacement of the active surface of the probe,
   checking the orientation of the probe with respect to the coordinate system linked to the examination area,
   checking the completion of the coverage of the examination area, with regards to a predefined coverage,
   checking the coupling between the active surface of the probe and the examination area of the mechanical part.

9. A device for non-destructive testing of a mechanical part, including an optical motion-tracking system, a non-destructive testing probe fixedly linked to a first rigid body, a pointing device including a tip and fixedly linked to a second rigid body, and a calculator,
   wherein the calculator is configured to:
   learn an origin of an examination area of the surface of the mechanical part using the pointing device, in a coordinate system linked to the optical motion-tracking system,
   learn axes of the examination area of the mechanical part using the pointing device, in the coordinate system linked to the optical motion-tracking system, so as to define a coordinate system linked to the examination area,
   learn an origin and axes of an emitter and receiver surface, called active surface of the probe using the pointing device, in a coordinate system linked to the first rigid body of the probe, and determine the origin and the orientation of the active surface of the probe, in a coordinate system linked to the examination area.

10. The device for non-destructive testing of a mechanical part according to claim 9, wherein the calculator is also configured to determine the dimensions of the examination area.

11. The device for non-destructive testing of a mechanical part according to claim 10,
wherein the calculator is also configured to perform at least one operation amongst:
determining the speed of displacement of the active surface of the probe,
checking the orientation of the probe with respect to the axes of the examination area,
checking the completion of the coverage of the examination area, with regards to a predefined coverage,
checking the coupling between the active surface of the probe and the examination area of the mechanical part.

12. A non-transitory computer-readable recording medium including computer executable instructions, wherein the instructions, when executed by a computer, cause the computer to perform a method to drive a device for non-destructive testing of a mechanical part, including an optical motion-tracking system, a non-destructive testing probe fixedly linked to a first rigid body, a pointing device including a tip and fixedly linked to a second rigid body, and a calculator, the method comprising:
learning of an origin of an examination area of the surface of the mechanical part using the pointing device, in a coordinate system linked to the optical motion-tracking system,
learning of axes of the examination area of the mechanical part using the pointing device, in the coordinate system linked to the optical motion-tracking system, so as to define a coordinate system linked to the examination area,
learning of an origin and of axes of an emitter and receiver surface, called active surface, of the probe using the pointing device, in a coordinate system linked to the first rigid body of the probe, and
determination of the position and of the orientation of the active surface of the probe, in the coordinate system linked to the examination area.

* * * * *